United States Patent [19]
Omura et al.

[11] Patent Number: 5,216,520
[45] Date of Patent: Jun. 1, 1993

[54] FACSIMILE APPARATUS COMPRISING AUTOMATIC RECEPTION MODE

[75] Inventors: Kunihiko Omura; Hiroaki Hamano, both of Osaka, Japan

[73] Assignee: Minolta Camera Kabushiki Kaisha, Osaka, Japan

[21] Appl. No.: 541,922

[22] Filed: Jun. 21, 1990

[30] Foreign Application Priority Data

Jun. 22, 1989 [JP] Japan ................................. 1-160301

[51] Int. Cl.$^5$ .............................................. H04N 1/32
[52] U.S. Cl. ................................... 358/437; 358/468; 358/405; 358/442
[58] Field of Search ............... 358/442, 468, 434, 437, 358/435, 436, 439, 405

[56] References Cited

U.S. PATENT DOCUMENTS 4,710,951 12/1987 Itezono ................................ 379/100
5,040,077 8/1991 Hamano ............................. 358/437
5,055,945 10/1991 Oguma et al. ....................... 358/437

FOREIGN PATENT DOCUMENTS 61-245767 11/1986 Japan.

Primary Examiner—Michael T. Razavi
Assistant Examiner—Steven P. Klocinski
Attorney, Agent, or Firm—Willian Brinks Olds Hofer Gilson & Lione

[57] ABSTRACT

There is disclosed a facsimile apparatus comprising a transmitter for transmitting an image signal to another facsimile apparatus through a communication line and a receiver for receiving an image signal from another facsimile apparatus through the communication line. In the facsimile apparatus, a detector detects completion of the transmission operation by the transmitter and completion of the reception operation by the receiver, and a counter counts a preset time, which is started when the detector detects the completion of the transmission operation by the transmitter or completion of the reception operation by the receiver. Further, a controller controls the transmitter and the receiver so as to prohibit the receiver from performing the reception operation while the counter counts the predetermined time, and to permit the transmitter to perform the transmission operation.

7 Claims, 11 Drawing Sheets

FACSIMILE APPARATUS COMPRISING AUTOMATIC RECEPTION MODE

BACKGROUND OF THE INVENTION

1. Field of the Invention

The present invention relates to a facsimile apparatus, more particularly, to a facsimile apparatus comprising an automatic reception mode for automatically receiving image data responsive to a reception request signal transmitted from an originating facsimile apparatus.

2. Description of Related Art

A conventional facsimile apparatus comprises an automatic reception function, generally. In the automatic reception function, when the facsimile apparatus receives a reception request signal from an originating facsimile apparatus, the reception process is started automatically, and then, image data transmitted therefrom are received without operation of the operator.

The automatic reception function seems to be one of the necessary functions in the facsimile apparatus.

However, in order to transmit image data, the operator waits for completion of the reception process, and thereafter, just before he instructs to execute the transmission process after the previous reception process, the facsimile apparatus may start to execute the next reception process, soon. In this case, he can not operate the facsimile apparatus, and can not start executing the transmission process.

Further, just before another operator instructs to execute another transmission process as soon as one transmission process is completed, the automatic reception process may be started for the minute between the completion of the previous transmission process and the next transmission process. In this case, he must wait for completion of the reception process in order to execute the transmission process.

In these cases, the operators feel inconvenience, and they can not transmit image data even in such an emergency case that the image data must be transmitted soon.

SUMMARY OF THE INVENTION

An essential object of the present invention is to provide a facsimile apparatus comprising the automatic reception mode, which has an improved operation performance.

Another object of the present invention is to provide a facsimile apparatus comprising the automatic reception mode, which does not disturb the operator's emergency use.

A further object of the present invention is to provide a facsimile apparatus comprising the automatic reception mode, which is capable of transmitting image data of a document at an earlier time.

A still further object of the present invention is to provide a facsimile apparatus comprising the automatic reception mode, which is capable of certainly executing the transmission process for a predetermined time interval after the previous reception process or the previous transmission process is completed.

A still more further object of the present invention is to provide a communication control method provided in a facsimile apparatus comprising the automatic reception mode, which is capable of certainly executing the transmission process for a predetermined time interval after the previous reception process or the previous transmission process is completed.

In order to accomplish the above objects, according to one aspect of the present invention, there is provided a facsimile apparatus comprising:

transmission means for transmitting an image signal to another facsimile apparatus through a communication line;

reception means for receiving an image signal from another facsimile apparatus through said communication line;

detection means for detecting completion of the transmission operation by said transmission means and completion of the reception operation by said reception means;

count means for counting a preset time, which is started when said detection means detects the completion of the transmission operation by said transmission means or completion of the reception operation by said reception means; and control means for controlling said transmission means and said reception means so as to prohibit said reception means from performing the reception operation while said count means counts said predetermined time, and to permit said transmission means to perform the transmission operation.

According to another aspect of the present invention, there is provided a facsimile apparatus comprising:

transmission means for transmitting an image signal to another facsimile apparatus through a communication line;

reception means for receiving an image signal from another facsimile apparatus through said communication line;

detection means for detecting completion of the reception operation by said reception means; and prohibition means for prohibiting said reception means from starting to perform the next reception operation after said detection means detects completion of the reception operation by said reception means.

According to a further aspect of the present invention, there is provided a facsimile apparatus comprising:

transmission means for transmitting an image signal to another facsimile apparatus through a communication line;

reception means for receiving an image signal from another facsimile apparatus through said communication line;

operation means for instructing to start said transmission means in performing the transmission operation;

setting means for setting a reception prohibition mode in said facsimile apparatus; and control means for prohibiting said reception means from performing the reception operation in said reception prohibition mode, and for starting said transmission means in performing the transmission operation when it is instructed by said operation means to start said transmission means in performing the transmission operation in said reception prohibition mode.

According to a still further aspect of the present invention, there is provided a facsimile apparatus comprising:

transmission means for transmitting an image signal to another facsimile apparatus through a communication line;

reception means for receiving an image signal from another facsimile apparatus through said communication line; and prohibition means for prohibiting said reception means from starting to perform the reception operation after completion of a predetermined operation.

According to a still more further aspect of the present invention, there is provided a facsimile apparatus comprising:

transmission means for transmitting an image signal to another facsimile apparatus through a communication line;

reception means for receiving an image signal from another facsimile apparatus through said communication line;

operation means for starting said transmission means in performing the transmission operation;

setting means for selectively setting either a first operation mode or a second operation mode in said facsimile apparatus;

reception control means for controlling said reception means so as to prohibit said reception operation from being performed in said first operation mode, and so as to permit said reception operation to be performed in said second operation mode; and transmission control means for controlling said transmission means so as to start to perform said transmission operation when said operation means is operated in said first operation mode or in said second operation mode.

According to a more still further aspect of the present invention, there is provided a communication control method provided in a facsimile apparatus, including steps of:

prohibiting a reception operation of the next signal upon completion of a transmission operation or a reception operation of a signal;

starting to transmit another signal in the case that there is performed an operation for transmitting another signal when said reception operation of the next signal is prohibited; and canceling prohibition of said reception operation of the next signal when a predetermined time has passed without performing the operation for transmitting another signal after said prohibition of said reception operation of the next signal.

BRIEF DESCRIPTION OF THE DRAWINGS

These and other objects and features of the present invention will become clear from the following description taken in conjunction with the preferred embodiment thereof with reference to the accompanying drawings, in which.

DETAILED DESCRIPTION OF THE PREFERRED EMBODIMENT

A facsimile apparatus of a preferred embodiment according to the present invention will be described below in the order of the following items with reference to the attached drawings.

(a) Composition of Facsimile apparatus
(b) Action of Facsimile apparatus
(b-1) Main routine
(b-2) Input and output process
(b-3) Standby mode process
(b-4) Register mode process
(b-5) Transmission mode process
(b-6) Reception mode process
(c) Modifications

(a) Composition of Facsimile Apparatus

Figure 1:
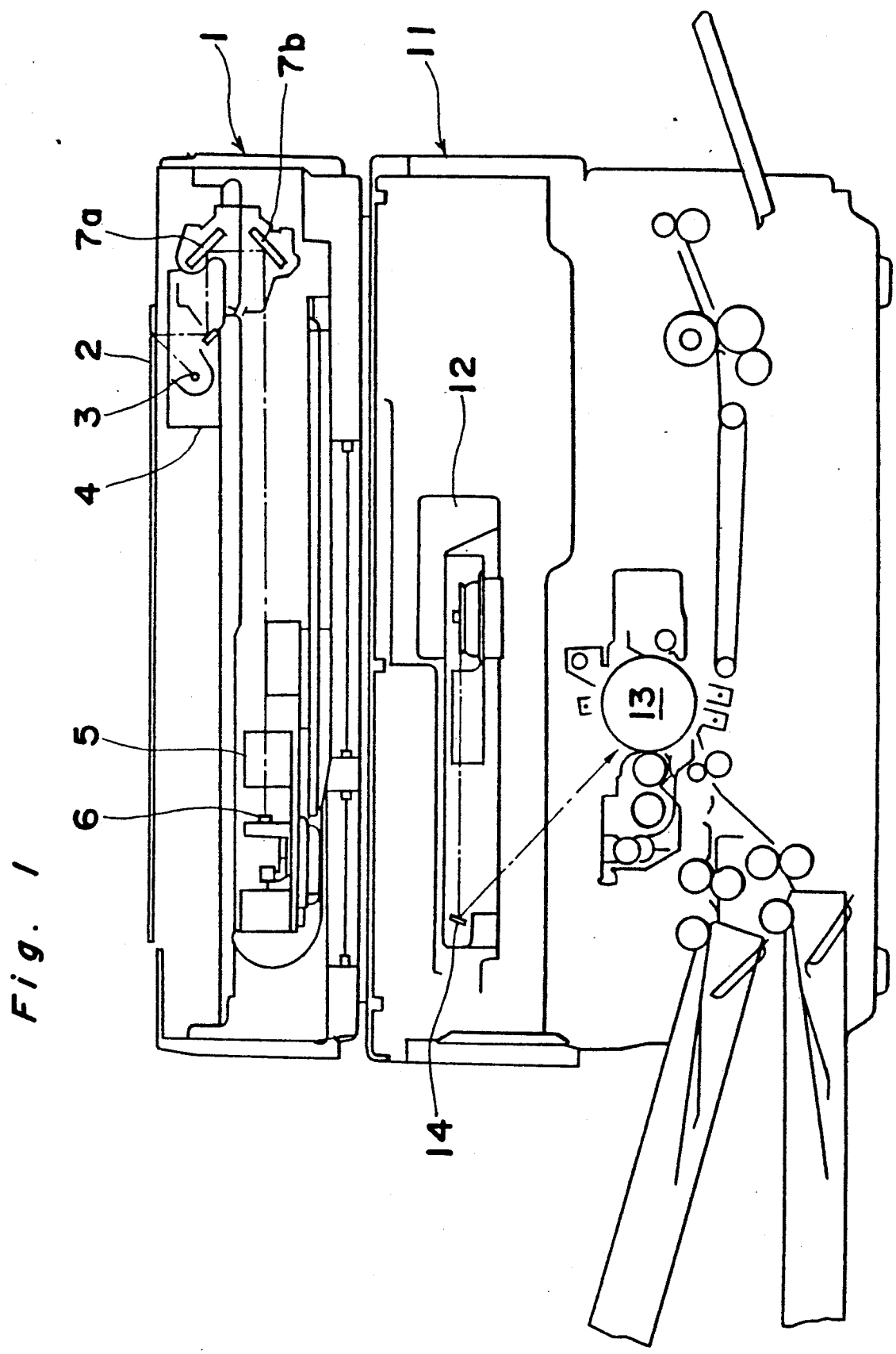
FIG. 1 is a schematic cross sectional view showing a facsimile apparatus of a preferred embodiment according to the present invention.

FIG. 1 is a schematic cross sectional view showing a facsimile apparatus of the preferred embodiment according to the present invention.

Referring to FIG. 1, the facsimile apparatus comprises an image reader section 1 for reading an image (referred to as a document image hereinafter) of a document set on a document table 2 and transmitting image data of the document image to a facsimile apparatus of a destination subscriber through a telephone line, and a printer section 11 for printing a document image of image data received through the telephone line from a facsimile apparatus of an originating subscriber.

In the image reader section 1, the document set on the document table 2 is scanned by a moving scanner 4 projecting light from a light source 3 onto the document. Light reflected from the document is reflected by mirrors 7a and 7b, and is incident onto a linear CCD image sensor 6 having a pixel density of eight pixels/mm through a focus lens 5 so that the document image is formed thereon. The CCD image sensor 6 reads the document image and outputs an electric image signal. As described in detail later, the electric image signal is converted into digital image data, and the converted digital image data are binarized into binary image data.

In the image reader section 1 of the present preferred embodiment, the CCD image sensor 6 is moved for the document set on the document table 2 by the scanner 4. However, the document set on the document table 2 may be moved for the CCD image sensor 6 by another scanner.

The printer section 11 comprises an electrophotographic laser printer which is well known to those skilled in the art. In the printer section 11, a laser diode of a laser optical system 12 emits laser light according to image data received from a facsimile apparatus of an originating subscriber so as to project the laser light onto a photoconductive drum 13 through a mirror 14. The laser light forms an electrostatic latent image of the image data on the photoconductive drum 13, and the electrostatic latent image is developed with toner so as to form a toner image thereon. The toner image is transferred onto a piece of printing paper and is fixed thereon, and then, the printing paper on which the toner image is formed is discharged.

The detailed description of the above reading operation and the printing operation is omitted in the specification since they are similar to that of a conventional laser copying machine.

Figure 2:
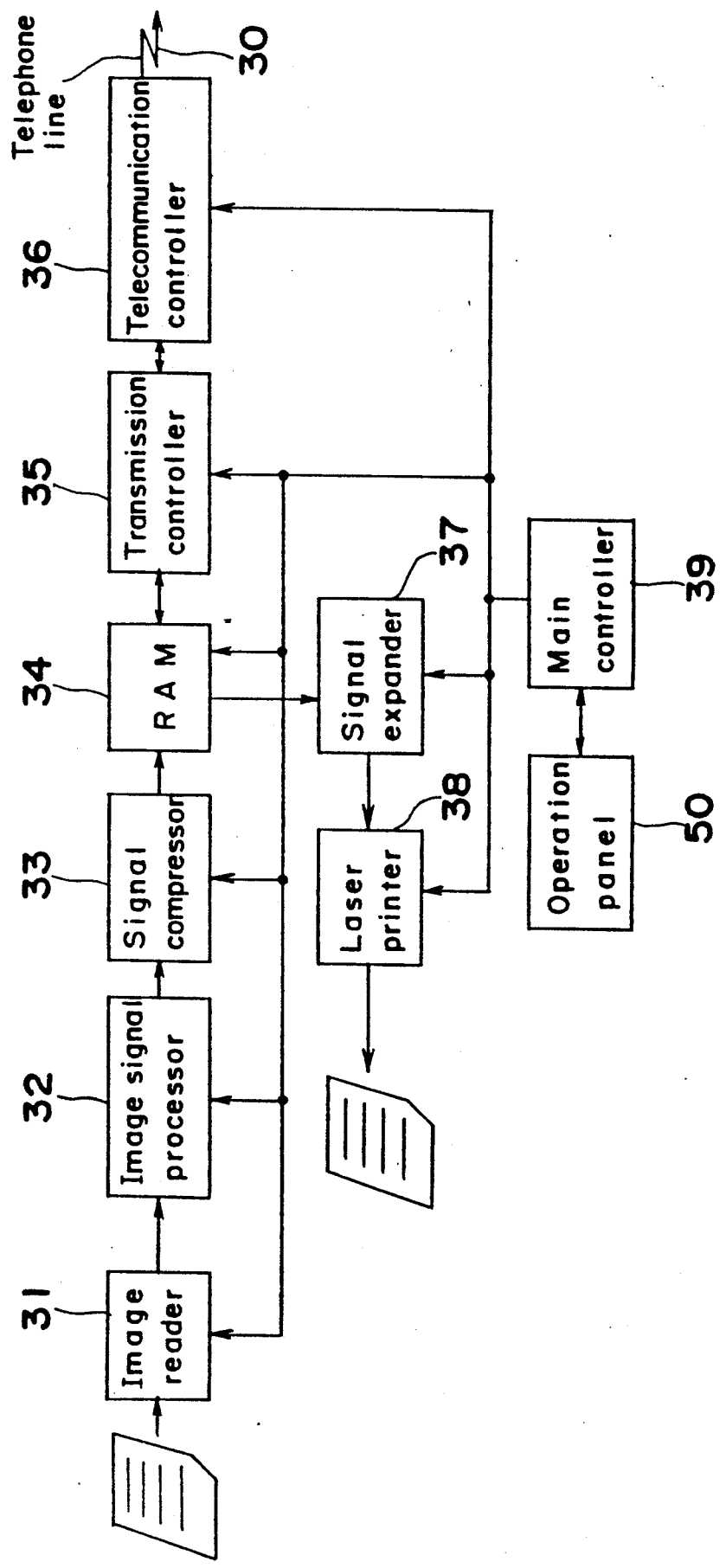
FIG. 2 is a block diagram showing a composition of the facsimile apparatus shown in FIG. 1.

FIG. 2 is a block diagram showing the facsimile apparatus shown in FIG. 1.

Referring to FIG. 2, an image reader 31 including the CCD image sensor 6 shown in FIG. 1 reads the document image and outputs an electric image signal of the document image, and then, an image signal processor 32 binarizes the electric image signal by, for example, the dither method so as to convert it into binary image data. Thereafter, a signal compressor 33 encodes the binary image data by either the modified READ coding method or the modified Huffman coding method, and stores the encoded image data in a random access memory (referred to as a RAM hereinafter) 34.

Upon transmitting image data, a telecommunication controller 36 performs a predetermined telephone line connection through the telephone line 30 with a facsimile apparatus of a destination subscriber. Thereafter, a transmission controller 35 reads out the image data stored in the RAM 34, modulates a carrier signal according to the read image data, and then, transmits the modulated carrier signal as a facsimile image signal to the facsimile apparatus of the destination subscriber through the telecommunication controller 36 and the telephone line 30.

Upon receiving image data, when the telecommunication controller 36 receives an incoming signal from an exchange (not shown) which is connected through the telephone line 30, it performs a predetermined telephone line connection process with a facsimile apparatus of an originating subscriber through the telephone line 30 and the exchange. Thereafter, the transmission controller 35 receives a facsimile image signal transmitted from the facsimile apparatus of the originating subscriber, demodulates it so as to convert it into image data, and stores the converted image data in the RAM 34. Thereafter, a signal expander 37 reads out the image data stored in the RAM 34, and decodes the image data so as to convert it into an image signal. A laser printer 38 prints an image of the received image data on a piece of printing paper according to the image signal inputted from the signal expander 37.

A main controller 39 controls the above operation of the facsimile apparatus according to instructions of an operator inputted using an operation panel 50, and also outputs status information of the facsimile apparatus and instructions for the operator to the operation panel 50 so as to display them thereon.

Figure 3:
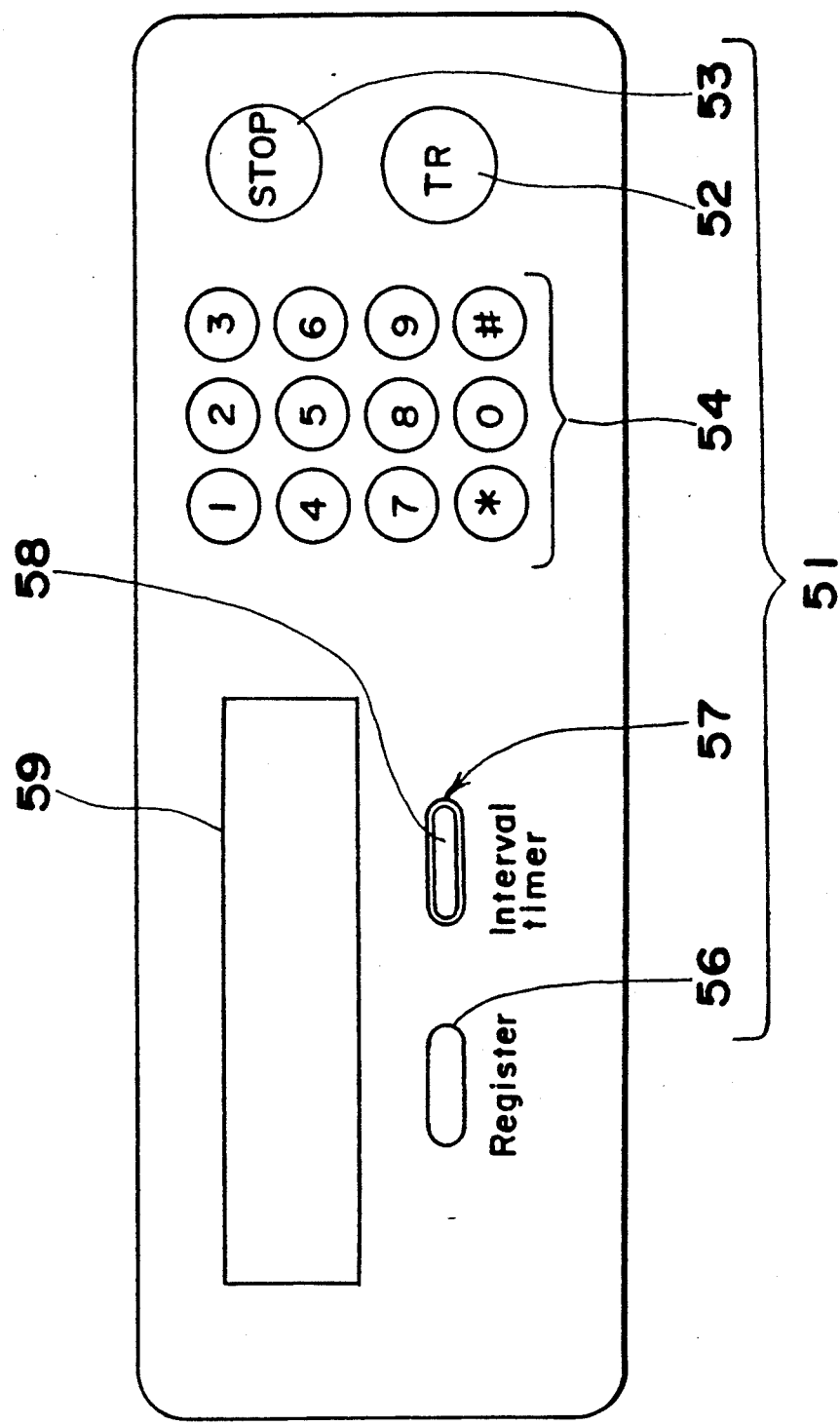
FIG. 3 is a top plan view showing an operation panel shown in FIG. 2.

FIG. 3 is a top plan view showing the operation panel 50 shown in FIG. 2.

Figure 9:
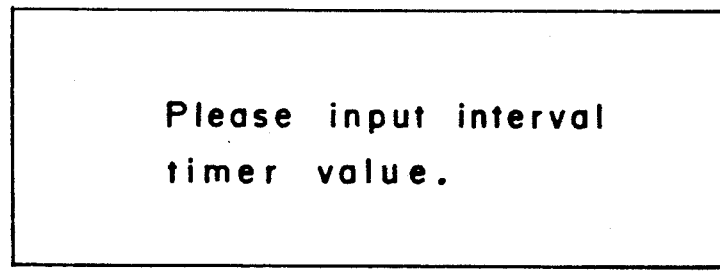
FIG. 9 is a front view showing a display displayed on a liquid crystal display shown in FIG. 3.

Referring to FIG. 3, the operation panel 50 comprises a key matrix unit 51 for inputting various kinds of information, a light emitting diode (referred to as an LED) 58 for displaying whether or not there is executed an interval timer function for prohibiting the automatic reception process for a predetermined time interval after the previous reception process is completed or the previous transmission process is completed, the LED 58 being included in an interval timer key 57, and a liquid crystal display (referred to as an LCD hereinafter) 59 for displaying a message as shown in FIG. 9.

The key matrix unit 51 comprises a transmission (TR) key 52 for starting the above reading operation of the image reader 31 and executing the transmission process of image data of the read document image, a STOP key 53 for interrupting the reading operation and the transmission process, and a set of ten keys 54 for telephones composed of keys "0" to "9", "*" and "#" which are used upon setting, clearing and registering telephone numbers of registered subscriber to which image data are to be transmitted, and a time interval value corresponding to a practical minimum time interval between the previous transmission or reception process and the next automatic reception process in the aforementioned interval timer function.

The key matrix unit 51 further comprises a register key 56 for selecting the register mode for registering a time interval value described above, and the interval timer key 57 for selecting whether or not the interval timer function is executed. The LED 58 is turned on when the aforementioned interval timer function is selected and is executed, and the LED 58 is turned off when the aforementioned interval timer function is not selected and is not executed.

Figure 4:
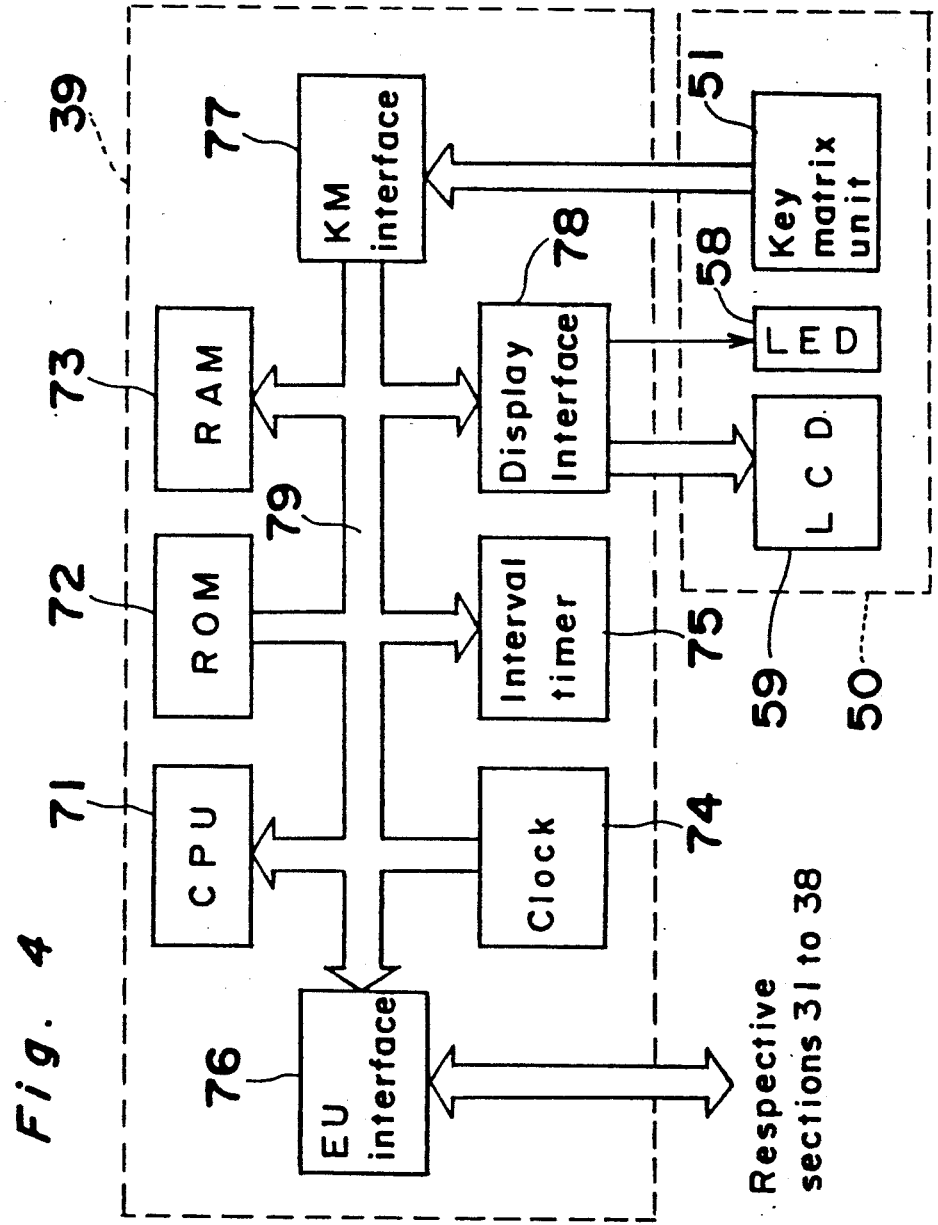
FIG. 4 is a block diagram showing a main controller shown in FIG. 2 and the operation panel shown in FIG. 3.

FIG. 4 shows the main controller 39 shown in FIG. 2.

Referring to FIG. 4, the main controller 39 comprises a central processing unit (referred to as a CPU hereinafter) 71 for controlling the operation of the facsimile apparatus shown in FIGS. 1 and 2, a read only memory (referred to as a ROM hereinafter) 72 for storing a system program of the CPU 71 and data required for executing the system program, a RAM 73 being used as a working area for storing parameters, flags and various kinds of information therein, a clock 74 for counting a present time, an interval timer 75 (referred to as an IT in the drawings) for counting a value incrementing the count value as a predetermined time passes after starting the interval timer 75, and outputting an interruption signal to the CPU 71 when the interval timer 75 has counted up to a preset time interval value, an external unit interface 76 connected to respective sections 31 to 38 shown in FIG. 2, a key matrix interface 77 connected to the key matrix unit 51, and a display interface 78 connected to the LED and the LCD 59, which are connected to each other through an internal bus 79.

It is to be noted that, when one of the keys 52 to 57 of the key matrix unit 51 is pressed, namely, it has been turned on after it is turned off, a key signal corresponding to the pressed key is inputted to the CPU 71 through the key matrix interface 77. It is described hereinafter in the specification that "a key has been turned on", when the key signal has been inputted to the CPU 71.

Figure 5:
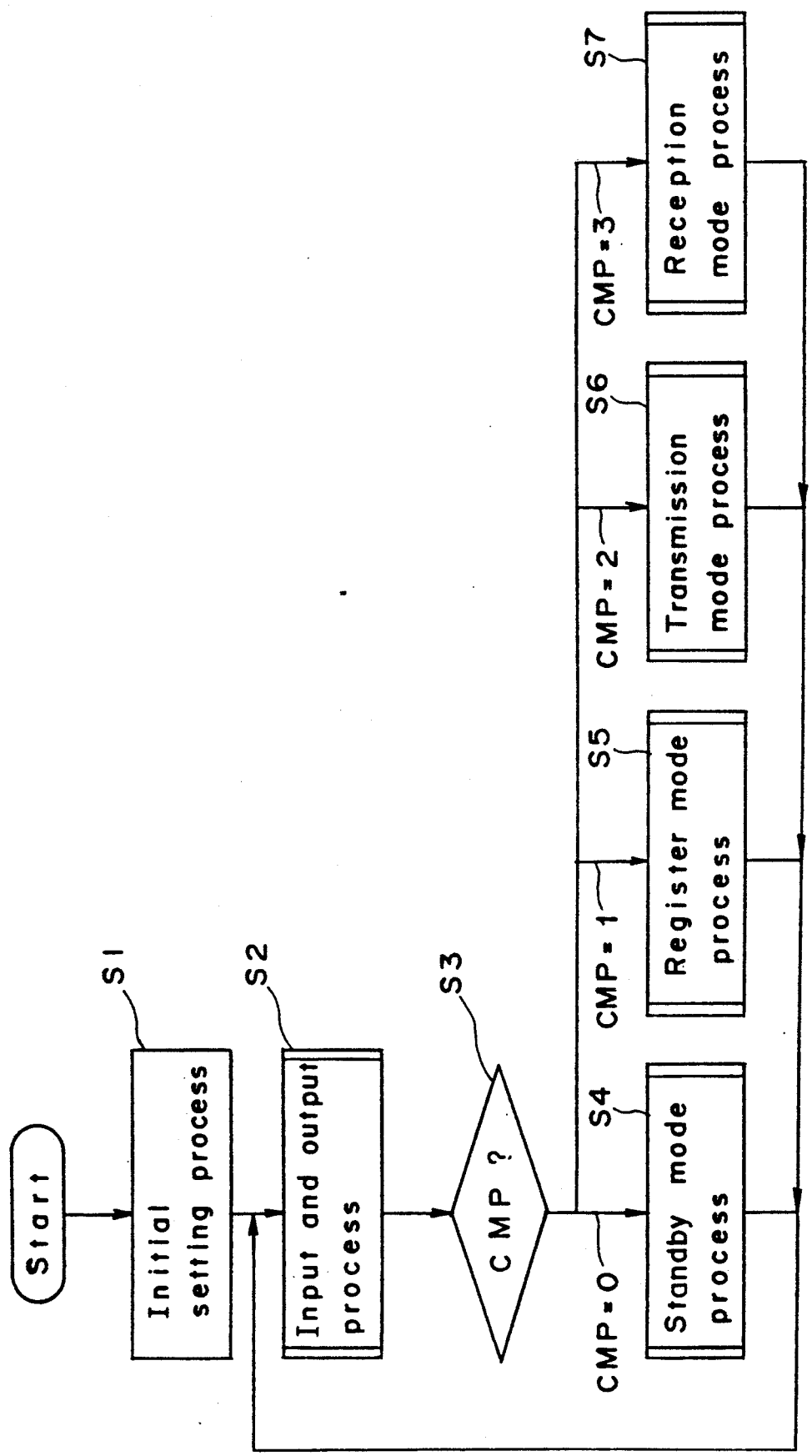
FIG. 5 is a flowchart showing a main routine which is executed by a CPU of the main controller shown in FIG. 4.

It is to be noted that a memory area of the RAM 73 comprises:

(1) a parameter and flag area for storing the following parameter and flag required for executing the system program stored in the ROM 72:

CMP: a control mode parameter for indicating preset one of operation modes of the facsimile apparatus shown in FIG. 5, ITF: an interval timer flag for indicating whether or not the interval timer key 58 has been turned on, namely, the interval timer function has been selected; and (2) a time interval value area for storing a time interval value used in the interval timer function.

(b) Action of Facsimile Apparatus

Figure 8:
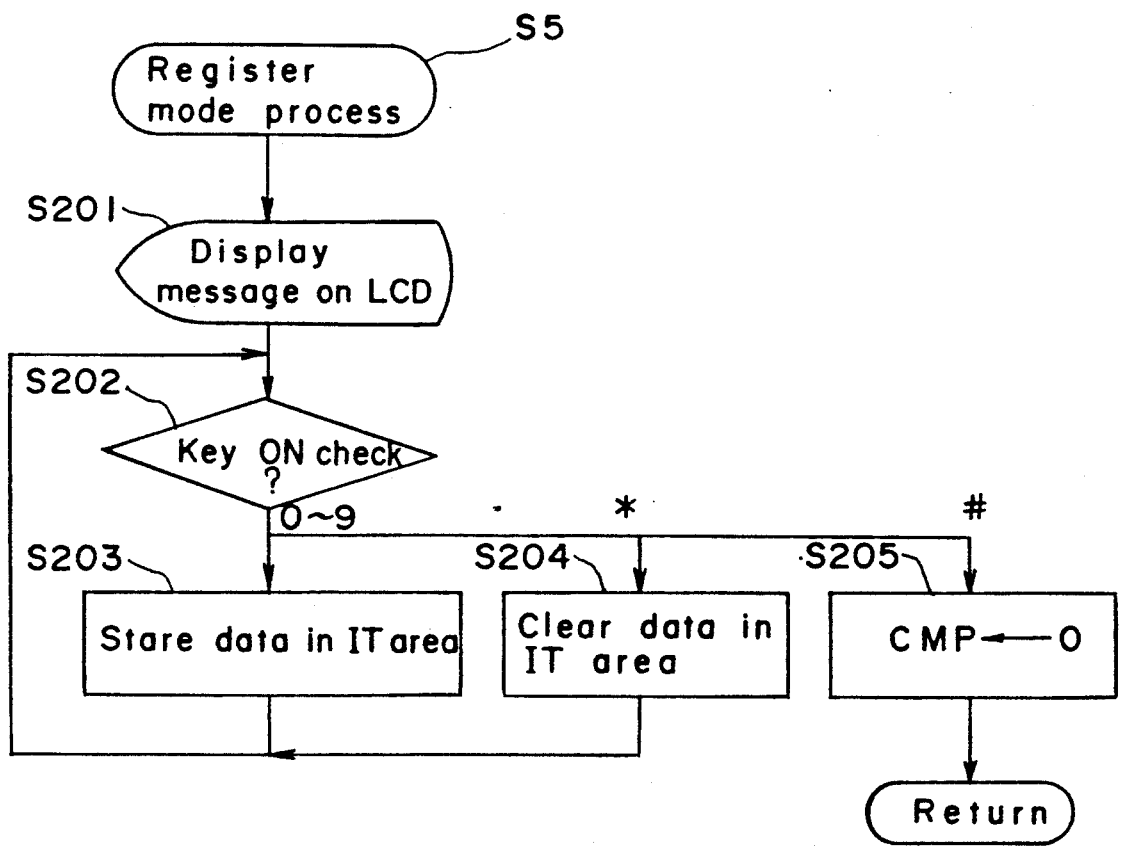
FIG. 8 is a flowchart showing a register mode process of a subroutine which is executed by the CPU of the main controller shown in FIG. 4.

The facsimile apparatus of the present preferred embodiment comprises an automatic reception mode for automatically receiving an facsimile signal including image data transmitted from another facsimile apparatus of an originating subscriber connected to the telephone line 30. When the interval timer key 57 is pressed so as to set the interval timer flag ITF at one, the interval timer function is selected and is executed, and then, the reception process is prohibited from being executed for a predetermined time interval corresponding to the preset interval timer value after the previous reception process or the previous transmission process (See step S611 of FIG. 10b and step S711 of FIG. 11b). The interval timer value can be registered by pressing the register key 56 and inputting numerals using a set of ten keys 54 so as to store them in the RAM 72 as shown in FIG. 8, and the interval timer value is set in the interval timer 75 of the main controller 39.

Namely, the interval timer 75 is started when a reception process is completed or a transmission process is completed, and is provided for prohibiting the reception process from being executed while the interval timer counts a value until it has counted up to the preset interval interval value. When the LED 58 for the interval timer function is turned on (See step S307 of FIG. 6b), the operator can judge that the transmission process can be executed after a transmission process or a reception process which is being executed at present is completed. Therefore, an emergency transmission process can be executed.

(b-1) Main Routine

FIG. 5 is a flowchart showing a main routine which is executed by the CPU 71 of the main controller 39.

Figure 6A:
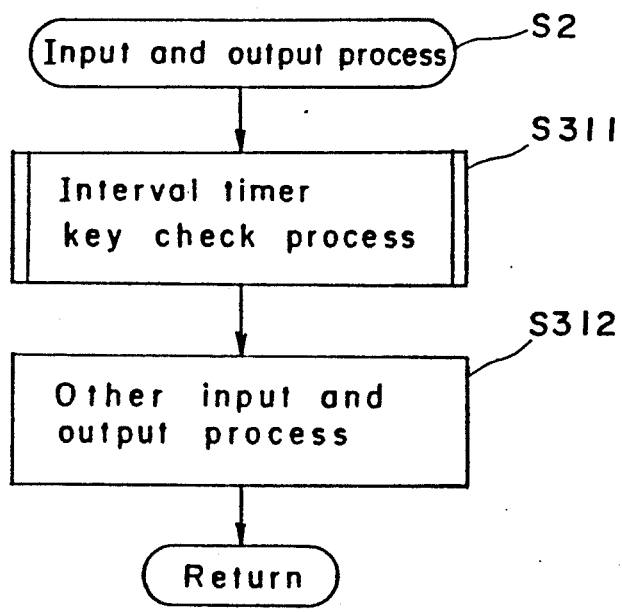
FIG. 6a is a flowchart showing an input and output process of a subroutine which is executed by the CPU of the main controller shown in FIG. 4.

Referring to FIG. 5, when the facsimile apparatus is turned on, first of all, the CPU 71 is reset, and there is executed an initial setting process for initializing the control mode parameter CMP, the interval timer flag ITF and the interval timer value so as to reset the parameter CMP and the flag ITF to zero and to set the interval timer value at a predetermined value at step S1. Thereafter, an input and output process is executed at step S2 as shown in FIG. 6a, wherein it is judged whether or not the interval timer key 57 has been turned on, namely, the interval timer function has been selected. Thereafter, the control mode parameter CMP is checked at step S3, and then, the program flow branches to either step S4, S5, S6 or S7.

When the control mode parameter CMP has been set at zero at step S3, the program flow goes to step S4, there is executed a standby mode process for executing predetermined processes according to the transmission key 52, the register key 56 and the received facsimile signal from another facsimile apparatus of an originating subscriber, and then, the program flow goes back to step S2.

When the control mode parameter CMP has been set at one at step S3, the program flow goes to step S5, there is executed a register mode process for setting a time interval value used in the timer interval function as shown in FIG. 8, and then, the program flow goes back to step S2.

When the control mode parameter CMP has been set at two at step S3, the program flow goes to step S6, there is executed a transmission mode process for executing a transmission process for a destination subscriber when a document is set on the document table 2 and the transmission key 52 is turned on, and then, the program flow goes back to step S2.

When the control mode parameter CMP has been set at three at step S3, the program flow goes to step S7, there is executed a reception mode process for executing a reception process when an incoming signal is received from the exchange and a facsimile signal is received from another facsimile apparatus of an originating subscriber, and then, the program flow goes back to step S2.

(b-2) Input and Output Process

FIG. 6a shows the input and output process (step S2) of a subroutine shown in FIG. 5.

Figure 6B:
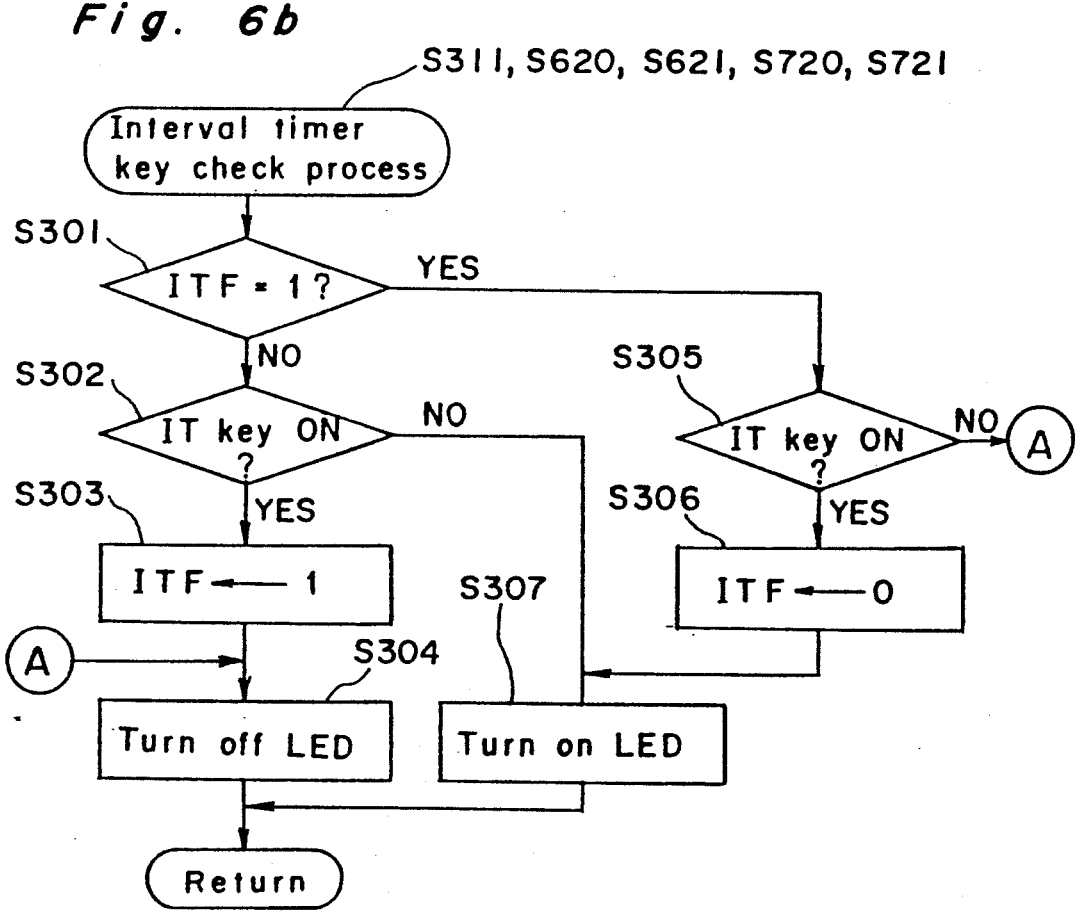
FIG. 6b is a flowchart showing an interval timer key check process of a subroutine which is executed by the CPU of the main controller shown in FIG. 4.

Referring to FIG. 6a, first of all, there is executed at step S311 an interval timer key check process shown in FIG. 6b, and then, there is executed at step S312 the other input and output process for executing the other input processes with respect to the other keys and sensors and for executing an output process for outputting image data to the laser printer 38. Thereafter, the program flow returns to the main routine.

Figure 10A:
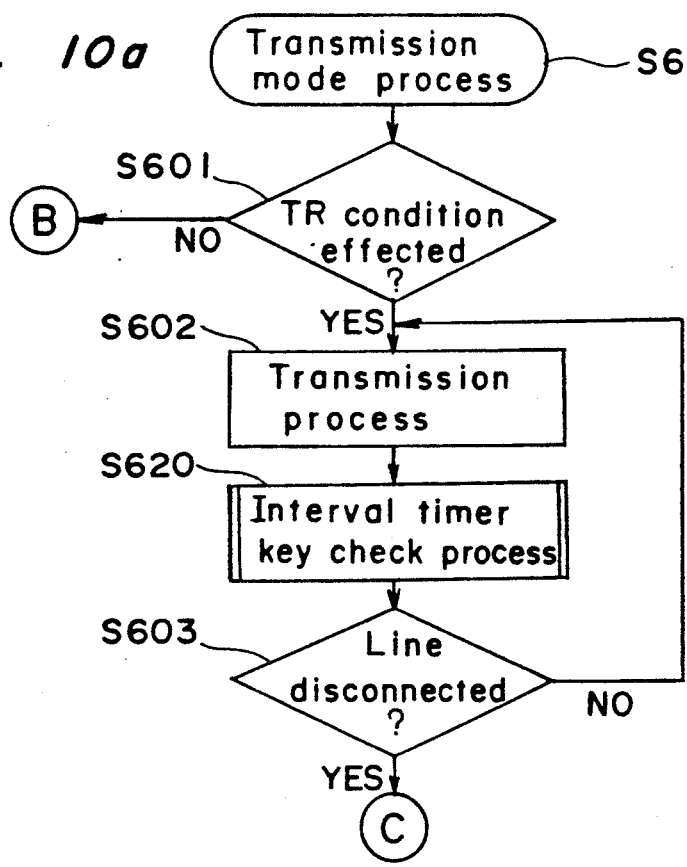
FIGS. 10a and 10b are flowcharts showing a transmission mode process of a subroutine which is executed by the CPU of the main controller shown in FIG. 4.
Figure 11A:
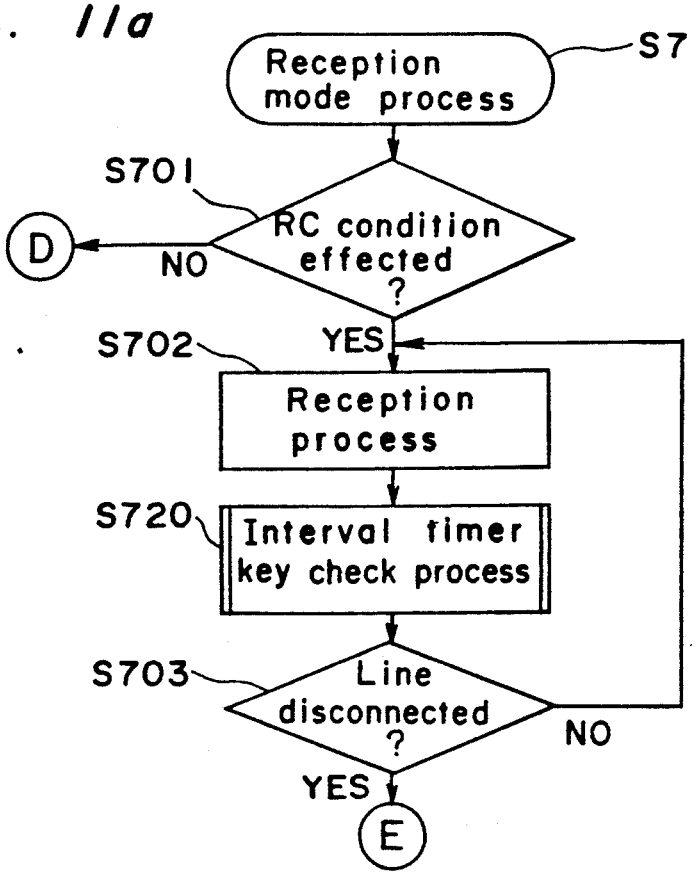
FIGS. 11a and 11b are flowcharts showing a reception mode process of a subroutine which is executed by the CPU of the main controller shown in FIG. 4.
Figure 10B:
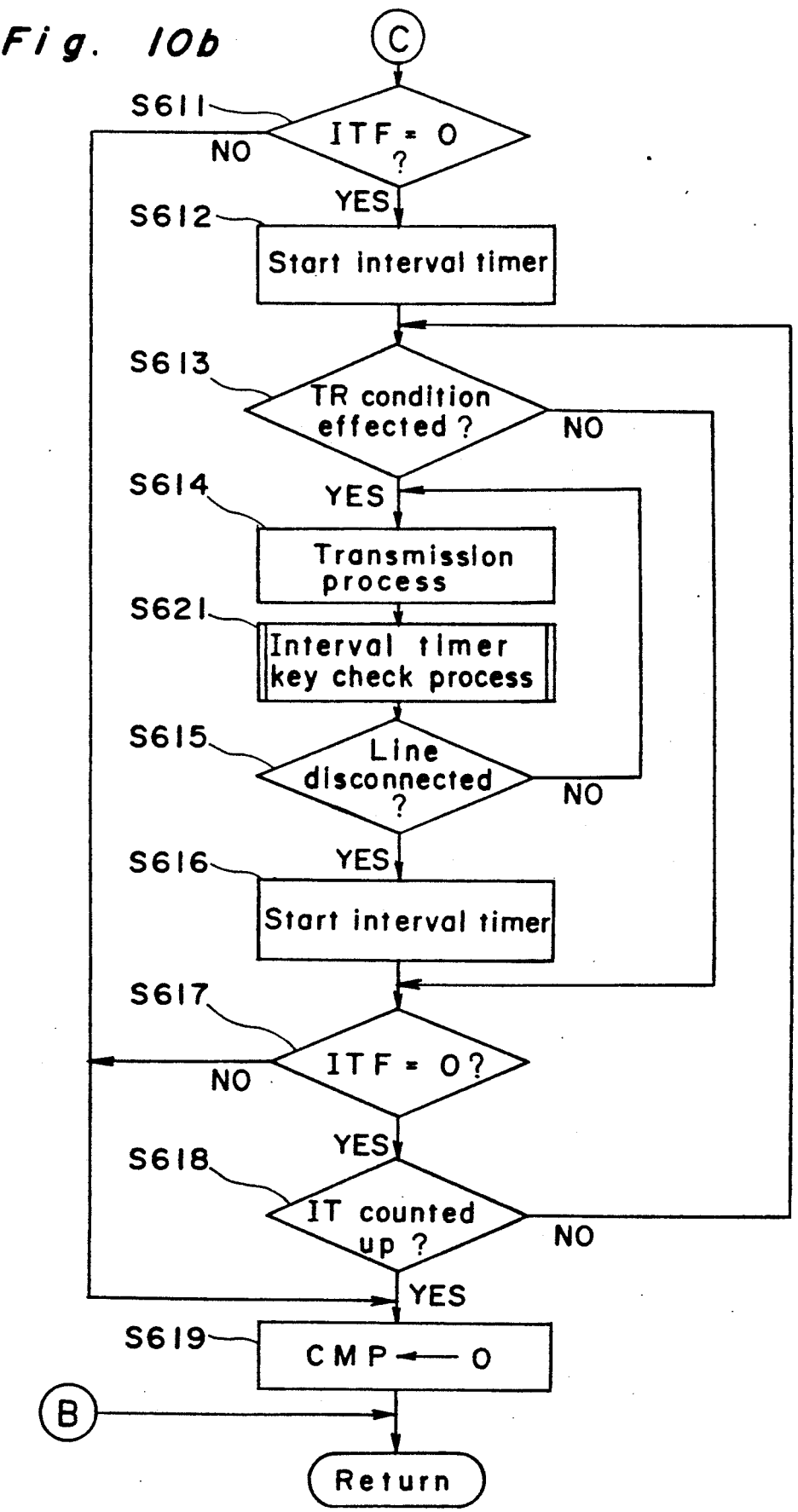
Figure 11B:
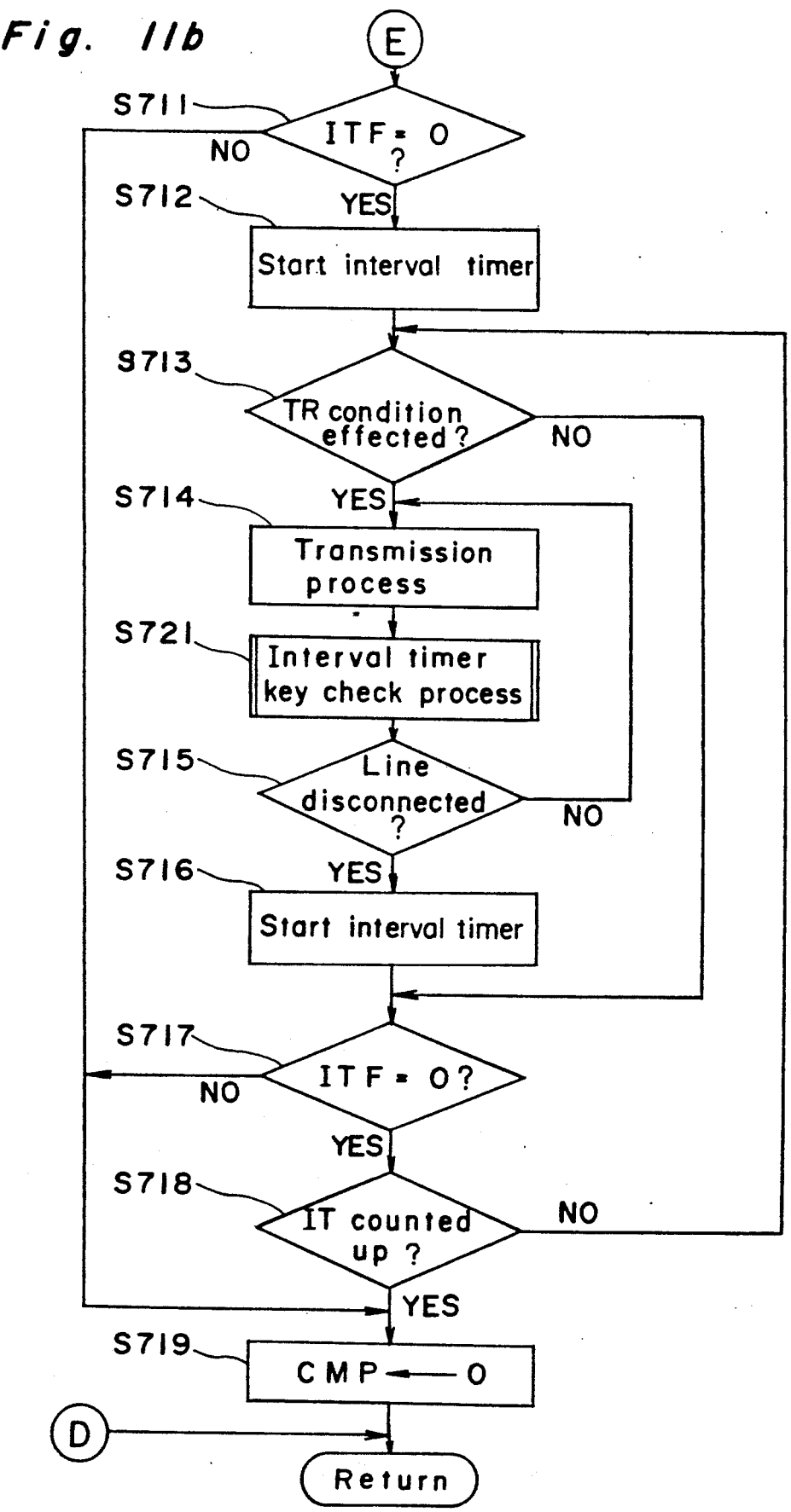

FIG. 6b shows the interval timer key check process (step S311 of FIG. 6a, step S620 of FIG. 10a, step S621 of FIG. 10b, step S720 of FIG. 11a and step S721 of FIG. 11b).

Referring to FIG. 6b, it is judged whether or not the interval timer flag ITF has been set at one at step S301. It is to be noted that the interval timer flag ITF is reset to zero in the initial setting process, and then, the interval timer function is selected.

If the interval timer flag ITF has been set at zero or the interval timer function is selected (No at step S301), the program flow goes to step S302. On the other hand, if the interval timer flag ITF has been set at one or the interval timer function is not selected (Yes at step S301), the program flow goes to step S305 in order to receive alteration of selection of the interval timer function. At steps S302 and S305, it is judged whether or not the interval timer key 57 has been turned on.

If the interval timer key 57 has been turned on (Yes at step S302), the interval timer flag ITF is set at one at step S303, and then, the LED 58 is turned off at step S304 so as to display the unexecution of the interval timer function and the program flow returns to the original routine. Otherwise (No at step S302), the program flow goes to step S307.

If the interval timer key 58 has been turned on (Yes at step S305), the interval timer flag ITF is reset to zero at step S306, and then, the LED 58 is turned on at step S307 so as to display the execution of the interval timer function and the program flow returns to the original routine. Otherwise (No at step S305), the program flow goes to step S304.

(b-3) Standby Mode Process

Figure 7:
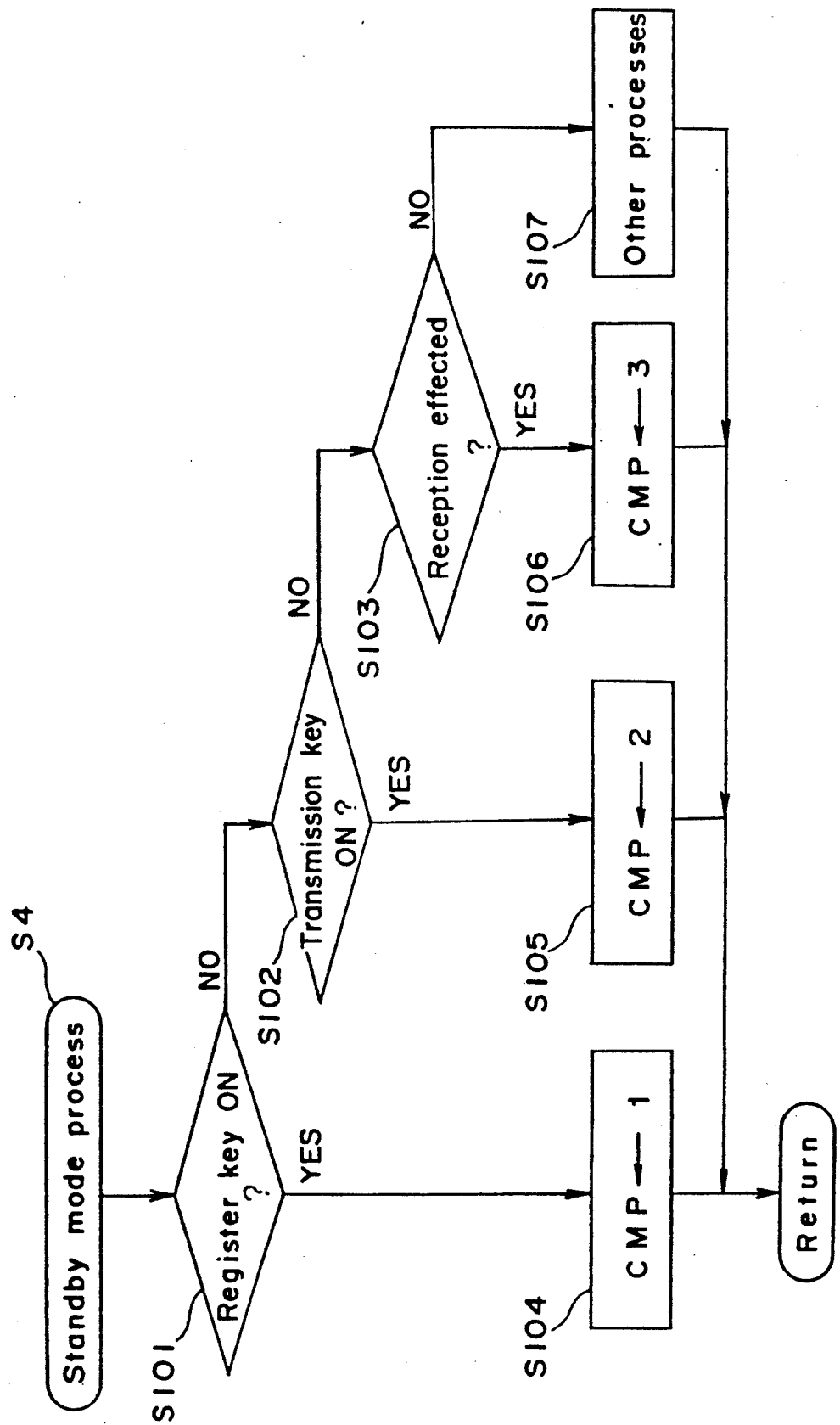
FIG. 7 is a flowchart showing a standby mode process of a subroutine which is executed by the CPU of the main controller shown in FIG. 4.

FIG. 7 shows the standby mode process (step S4) of a subroutine shown in FIG. 5.

Referring to FIG. 7, it is judged whether or not the register key 56 has been turned on at step S101, and it is judged whether or not the transmission key 52 has been turned on at step S102. If the register key 56 has been turned on (Yes at step S101), the control mode parameter CMP is set at one at step S104, and then, the program flow returns to the main routine. If the transmission key 52 has been turned on (Yes at step S102), the control mode parameter CMP is set at two at step S105, and then, the program flow returns to the main routine.

If the register key 56 has not been turned on (No at step S101) and the transmission key 52 has not been turned on (No at step S102), it is judged whether or not the reception condition have been effected at step S103. Namely, if an incoming signal has been received from the exchange (Yes at step S103), the control mode parameter CMP is set at three at step S106, and then, the program flow returns to the main routine.

On the other hand, if the register key 56 has not been turned on (No at step S101), the transmission key 52 has not been turned on (No at step S102), and the reception condition have not been effected (No at step S103), the other predetermined processes are executed at step S107, and then, the program flow returns to the main routine.

(b-4) Register Mode Process

FIG. 8 shows the register mode process (step S5) of a subroutine shown in FIG. 5 for registering the aforementioned interval timer value used in the interval timer function.

Referring to FIG. 8, first of all, at step S201, there is displayed a message "Please input interval timer value" shown in FIG. 9 on the LCD 59 so as to instruct the operator to input a time interval value used in the interval timer function, and then, it is judged whether or not one of a set of ten keys 54 of the key matrix unit 51 has been turned on at step S202.

If one of the number keys "0" to "9" of a set of ten keys 54 has been turned on at step S202, data corresponding to the turned on number key are stored in the interval timer area of the RAM 73 at step S203 so as to add them to data having been stored therein already, and then, the program flow goes back to step S202. If the key "*" of a set of ten keys 54 has been turned on at step S202, data stored in the interval timer area of the RAM 73 are cleared at step S204, and then, the program flow goes back to step S202. If the key "#" of a set of ten keys 54 has been turned on at step S202, the control mode parameter CMP is reset to zero so as to set the standby mode, and then, the program flow returns to the main routine.

(b-5) Transmission Mode Process

FIGS. 10a and 10b show the transmission mode process (step S6) of a subroutine shown in FIG. 5.

Referring to FIG. 10a, first of all, it is judged at step S601 whether or not there is effected such a transmission condition that a document has been set on the document table 2, the facsimile number of a destination subscriber to which image data of the document are to be transmitted has been inputted certainly and the transmission key 52 has been pressed. If the transmission condition is effected (Yes at step S601), the program flow goes to step S602. Otherwise (No at step S601), the program flow returns to the main routine.

At step S602, there is executed the transmission process for transmitting image data to the destination facsimile apparatus through the telephone line 30 and the change. The transmission process is not described in detail herein since it is well known to those to skilled in the art. When a reception acknowledge signal is received from the facsimile apparatus of the reception side after the transmission process is completed, the telephone line 30 is disconnected according to a predetermined telephone line disconnection procedure. Thereafter, there is executed the interval timer key check process shown in FIG. 6b at step S620, and then, it is judged at step S603 whether or not the telephone line 30 has been disconnected.

If the telephone line 30 has not yet been disconnected (No at step S603), the program flow goes to step S602, and then, the transmission process is executed continuously. On the other hand, if the telephone line 30 has been disconnected (Yes at step S603), the program flow goes to step S611 of FIG. 10b.

Referring to FIG. 10b, it is judged at step S611 whether or not the interval timer flag ITF is set at zero. If the interval timer flag ITF is set at one or the interval timer function has not been selected (No at step S611), the program flow goes to step S619, and then, the control mode parameter CMP is set at zero so as to set the standby mode, and the program flow returns to the main routine.

On the other hand, if the interval timer flag ITF is set at zero or the interval timer function has been selected (Yes at step S611), the program flow goes to step S612, and then, the interval timer value stored in the interval timer value area of the RAM 73 is read out, is set in the interval timer 75, and the interval timer 75 is started.

Thereafter, it is judged at step S613 whether or not the aforementioned transmission condition is effected. If the transmission condition is effected (Yes at step S613), the program flow goes to step S614. On the other hand, otherwise (No at step S613), the program flow goes to step S617.

At step S614, there is executed the transmission process, and then, there is executed the interval timer key check process shown in FIG. 6b at step S621. Thereafter, it is judged at step S615 whether or not the telephone line 30 has been disconnected. If the telephone line 30 has not yet been disconnected (No at step S615), the program flow goes back to step S614, and then, the transmission process is executed continuously. On the other hand, if the telephone line 30 has been disconnected (Yes at step S615), the program flow goes to step S616. Then, the interval timer value stored in the interval timer value area of the RAM 73 is read out, is set in the interval timer 75, and the interval timer 75 is started.

Thereafter, it is judged at step S617 whether or not the interval timer flag ITF is set at zero. If the interval timer flag ITF is altered to one during the transmission process or the interval timer function is not selected (No at step S617), the program flow goes to step S619. On the other hand, if the interval timer flag ITF is still set at zero (Yes at step S617), the program flow goes to step S618, and then, it is judged whether or not the interval timer 75 has counted up to the preset interval timer value.

If the interval timer 75 has not yet counted up (No at step S618), the program flow goes back to step S613 so as to transmit image data of the next document. On the other hand, if the interval timer 75 has counted up (Yes at step S618), the program flow goes to step S619, and then, the control mode parameter CMP is set at zero so as to set the standby mode. Thereafter, the program flow returns to the main routine.

(b-6) Reception Mode Process

FIGS. 11a and 11b show the reception mode process (step S7) of a subroutine shown in FIG. 5.

Referring to FIG. 11a, first of all, it is judged at step S701 whether or not there is effected such a reception condition that an incoming signal has been received from the exchange through the telephone line 30. If the reception condition is effected (Yes at step S701), the program flow goes to step S702. Otherwise (No at step S701), the program flow returns to the main routine.

At step S702, there is executed the reception process for receiving image data transmitted from an originating facsimile apparatus through the telephone line 30 and the exchange. The reception process is not described in detail herein since it is well known to those to skilled in the art. After the reception process is completed, the reception acknowledge signal is transmitted to the originating facsimile apparatus of the transmission side, the telephone line 30 is disconnected according to the predetermined telephone line disconnection procedure. Thereafter, there is executed the interval timer key check process shown in FIG. 6b at step S720, and then, it is judged at step S703 whether or not the telephone line 30 has been disconnected.

If the telephone line 30 has not yet been disconnected (No at step S703), the program flow goes to step S702, and then, the reception process is executed continuously. On the other hand, if the telephone line 30 has been disconnected (Yes at step S703), the program flow goes to step S711 of FIG. 11b.

Referring to FIG. 11b, it is judged at step S711 whether or not the interval timer flag ITF is set at zero. If the interval timer flag ITF is set at one or the interval timer function has not been selected (No at step S711), the program flow goes to step S719, and then, the control mode parameter CMP is set at zero so as to set the standby mode, and the program flow returns to the main routine.

On the other hand, if the interval timer flag ITF is set at zero or the interval timer function has been selected (Yes at step S711), the program flow goes to step S712, and then, the interval timer value stored in the interval timer value area of the RAM 73 is read out, is set in the interval timer 75, and the interval timer 75 is started.

Thereafter, it is judged at step S713 whether or not the aforementioned transmission condition is effected. If the transmission condition is effected (Yes at step S713), the program flow goes to step S714. On the other hand, otherwise (No at step S713), the program flow goes to step S717.

At step S714, there is executed the transmission process, and then, there is executed the interval timer key check process shown in FIG. 6b at step S721. Thereafter, it is judged at step S715 whether or not the telephone line 30 has been disconnected. If the telephone line 30 has not yet been disconnected (No at step S715), the program flow goes back to step S714, and then, the transmission process is executed continuously. On the other hand, if the telephone line 30 has been disconnected (Yes at step S715), the program flow goes to step S716. Then, the interval timer value stored in the interval timer value area of the RAM 73 is read out, is set in the interval timer 75, and the interval timer 75 is started.

Thereafter, it is judged at step S717 whether or not the interval timer flag ITF is set at zero. If the interval timer flag ITF is altered to one during the transmission process or the interval timer function is not selected (No at step S717), the program flow goes to step S719. On the other hand, if the interval timer flag ITF is still set at zero (Yes at step S717), the program flow goes to step S718, and then, it is judged whether or not the interval timer 75 has counted up to the preset interval timer value.

If the interval timer 75 has not yet counted up (No at step S718), the program flow goes back to step S713 so as to transmit image data of the next document. On the other hand, if the interval timer 75 has counted up (Yes at step S718), the program flow goes to step S719, and then, the control mode parameter CMP is set at zero so as to set the standby mode. Thereafter, the program flow returns to the main routine.

(c) Modifications

During the transmission process (step S602) of the transmission mode process (step S6) or the reception process (step S702) of the reception mode process (step S7), the main controller 30 may supervise press of the register key 56, and when the register key 56 is pressed, the register mode process shown in FIG. 8 may be executed in parallel to the transmission process or the reception process so as to register the interval timer value during the transmission process or the reception process.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A facsimile apparatus comprising:
   transmission means for transmitting an image signal to another facsimile apparatus through a communication line;
   reception means for receiving an image signal from another facsimile apparatus through said communication line;
   detection means for detecting completion of a transmission operation by said transmission means and completion of a reception operation by said reception means;
   count means for counting a predetermined time, which is started when said detection means detects the completion of the transmission operation by said transmission means or completion of the reception operation by said reception means; and
   control means for controlling said transmission means and said reception means so as to prohibit said reception means from performing a reception operation and to permit said transmission means to perform a transmission operation while said count means counts said predetermined time.

2. The apparatus as claimed in claim 1, further comprising alteration means for altering said predetermined set in said count means.

3. A facsimile apparatus comprising:
   transmission means for transmitting an image signal to another facsimile apparatus through a communication line;
   reception means for receiving an image signal from another facsimile apparatus through said communication line;
   detection means for detecting completion of a reception operation by said reception means;
   prohibition means for prohibiting said reception means from starting to perform a next reception operation each time said detection means detects completion of a reception operation by said reception means; and cancellation means for automatically canceling said prohibition of the next reception operation, wherein said cancellation means cancels said prohibition of the next reception operation when a predetermined time has passed after the completion of the reception operation by said reception means.

4. The apparatus as claimed in claim 3, further comprising display means for displaying that the start of the next reception operation is prohibited while the reception operation is performed.

5. A facsimile apparatus comprising:

transmission means for transmitting an image signal to another facsimile apparatus through a communication line;

reception means for receiving an image signal from another facsimile apparatus through said communication line;

operation means for starting said transmission means in performing a transmission operation;

setting means for selectively setting either a first operation mode or a second operation mode in said facsimile apparatus;

reception control means for controlling said reception means so as to prohibit a reception operation from being performed in said first operation mode, and so as to permit said reception operation to be performed in said second operation mode;

transmission control means for controlling said transmission means so as to start to perform said transmission operation when said operation means is operated in said first operation mode or in said second operation mode; and count means for counting a predetermined time, wherein said reception control means prohibits said reception operation from being started while said count means counts said predetermined time and permits said reception operation to be started after said count means has counted up to said predetermined time.

6. The apparatus as claimed in claim 5, further comprising display means for displaying that said first operation mode is set.

7. A communication control method provided in a facsimile apparatus, including steps of:

prohibiting a reception operation of a next signal upon completion of a transmission operation or a reception operation of a signal;

starting to transmit another signal in the case that there is performed an operation for transmitting another signal when said reception operation of the next signal is prohibited; and canceling prohibition of said reception operation of the next signal when a predetermined time has passed without performing the operation for transmitting another signal after said prohibition of said reception operation of the next signal.

* * * * *

UNITED STATES PATENT AND TRADEMARK OFFICE
CERTIFICATE OF CORRECTION

PATENT NO. : 5,216,520
DATED : June 1, 1993
INVENTOR(S) : Kunihiko Omura, et al.

It is certified that error appears in the above-identified patent and that said Letters Patent is hereby corrected as shown below:

In Col. 12, line 57 (claim 2, line 3), before "set", insert --time which is--.

Signed and Sealed this

Eighth Day of March, 1994

BRUCE LEHMAN

Attest:

Attesting Officer

Commissioner of Patents and Trademarks